United States Patent [19]

Takahashi et al.

[11] Patent Number: 5,053,966
[45] Date of Patent: Oct. 1, 1991

[54] MOTOR CONTROL APPARATUS FOR ELECTRIC POWER STEERING SYSTEM OF A MOTOR VEHICLE

[75] Inventors: Tsutomu Takahashi; Shinji Ito; Saiichiro Oshita; Toyohiko Mouri, all of Tokyo, Japan

[73] Assignee: Fuii Jukogyo Kabushiki Kaisha, Tokyo, Japan

[21] Appl. No.: 649,146

[22] Filed: Feb. 1, 1991

Related U.S. Application Data

[63] Continuation of Ser. No. 356,226, May 24, 1989, abandoned.

[30] Foreign Application Priority Data

May 28, 1988 [JP] Japan .................................. 63-130590

[51] Int. Cl.$^5$ ........................................... B62D 5/04
[52] U.S. Cl. ............................. 364/424.05; 180/79.1
[58] Field of Search ............... 364/424.05; 74/388 PS; 180/79.1, 141-143

[56] References Cited

U.S. PATENT DOCUMENTS

| | | | |
|---|---|---|---|
| 4,657,103 | 4/1987 | Shimizu | 180/79.1 |
| 4,715,461 | 12/1987 | Shimizu | 180/79.1 |
| 4,730,686 | 3/1988 | Shimizu | 364/424.05 |
| 4,819,170 | 4/1989 | Shimizu | 180/142 |
| 4,837,692 | 6/1989 | Shimizu | 180/79.1 |

Primary Examiner—Gary Chin
Attorney, Agent, or Firm—Beveridge, DeGrandi & Weilacher

[57] ABSTRACT

A motor control apparatus for an electric power steering system having a torsion torque sensor for detecting a torsion torque of the steering system of a vehicle, a command signal generating unit for generating a command signal in accordance with the torsion torque detected by the torque sensor, and a motor control unit for driving and controlling a motor of the electric power steering system in accordance with the command signal. The improvement of this invention is to assist steering force within the steering wheel correcting range. A steering speed detecting unit is provided for detecting the steering speed. The output signal from the steering speed range detecting unit is supplied to the steering wheel correction command unit which generates an assist correction signal. The assist correction signal has a characteristic that the absolute value thereof takes a predetermined value when a small steering angle range is detected. The output from the steering wheel correction command unit is supplied to the motor control unit to regulate the command signal. Such regulation may be effected so as to decrease the command signal as the vehicle speed increases. Alternatively, the command signal may be regulated in accordance with the correction factor signal.

11 Claims, 7 Drawing Sheets

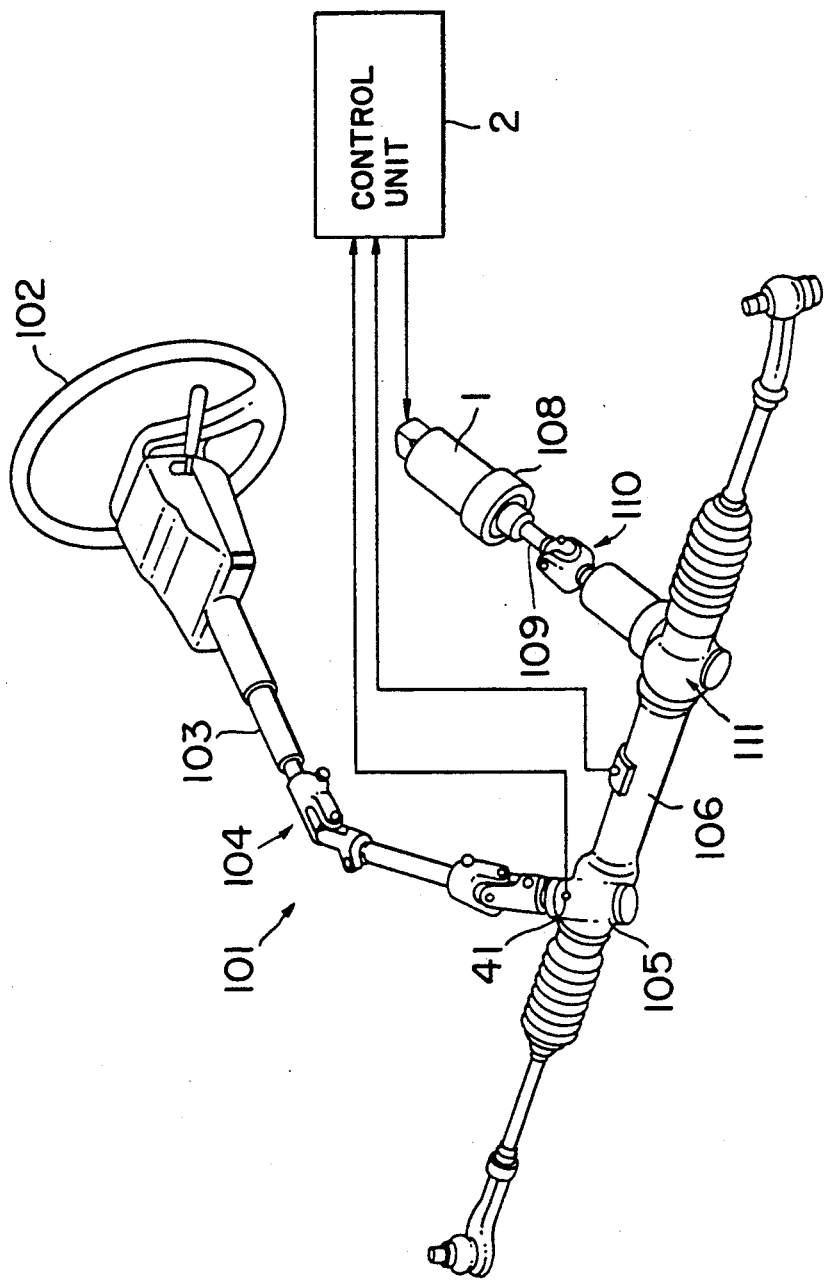
FIG. IA

MOTOR CONTROL APPARATUS FOR ELECTRIC POWER STEERING SYSTEM OF A MOTOR VEHICLE

This application is a continuation of application Ser. No. 07/356,226, filed May 24, 1989, now abandoned.

BACKGROUND OF THE INVENTION

1. Field of the Invention

The present invention relates to a motor control apparatus for an electric power steering system by which apparatus a motor-driven auxiliary steering power (power assist) is given to the steering system of a vehicle.

2. Related Background Art

A motor control apparatus for an electric power steering system of this type has already been proposed by the present applicant (refer to Japanese Patent Laid-open Publication 61-98675). This motor control apparatus is provided with a torsion torque sensor for detecting a torsion torque of the steering system as well as a vehicle speed sensor for detecting a vehicle speed and a steering angle sensor for detecting a steering angle. A command signal obtained as an output from the torsion torque sensor decreases as the vehicle speed obtained increases. The command signal is added to a return signal which increases as a steering angle obtained as an output from the steering angle sensor increases. The added signal is used for controlling the rotational direction and assist torque of the electric motor of the power steering system.

With the conventional motor control apparatus for the electric power steering system described above, power assist during a straight forward running of the vehicle has been (neglected) considered unnecessary. In this system a dead zone has been provided within a range of a small torsion torque. Accordingly, the power assist has not been obtained when a driver is holding a steering wheel for running on a gentle curve or when a driver is correcting the steering wheel after turning it, leaving the power assist function unsatisfactory.

SUMMARY OF THE INVENTION

The present invention has been made in consideration of the problem described above. It is therefore an object of the present invention to provide a motor control apparatus for an electric power steering system to obtain proper assist power during holding a steering wheel for small torsion torque and during correcting the steering wheel.

To achieve the above object according to the present invention, an electric power steering system for controlling rotational direction and torque of an electric motor by a drive control unit which receives a command signal based on the output signal from a torsion torque sensor, comprises: a steering correction command unit for generating an assist correction signal in accordance with output signals from the torsion torque sensor and from steering speed detection means for detecting a steering speed, the assist correction signal having a characteristic that an absolute value of the assist correction signal increases to a predetermined value in accordance with generated torsion torque within a steering wheel holding range having a low steering speed and within a steering wheel correcting range, and gradually decreases as the steering speed exceeds the steering correcting range.

The steering correction command unit is comprised such that the assist correction signal is decreased as the vehicle speed increases where the vehicle speed is represented by an output signal from the vehicle speed sensor.

The assist correction signal has a characteristic that the absolute value thereof increases to a predetermined value. And the assist correction signal is outputted from the steering correction unit when the steering wheel is in a holding range and when the steering wheel is in a correcting range, so that assist power for holding or correcting the steering wheel can be obtained.

BRIEF DESCRIPTION OF THE DRAWINGS

FIG. 1A is a perspective view showing a power steering system to which the present invention is applied;

DETAILED DESCRIPTION OF THE PREFERRED EMBODIMENTS

An embodiment of the present invention will be described in detail with reference to the accompanying drawings.

Figure 1:
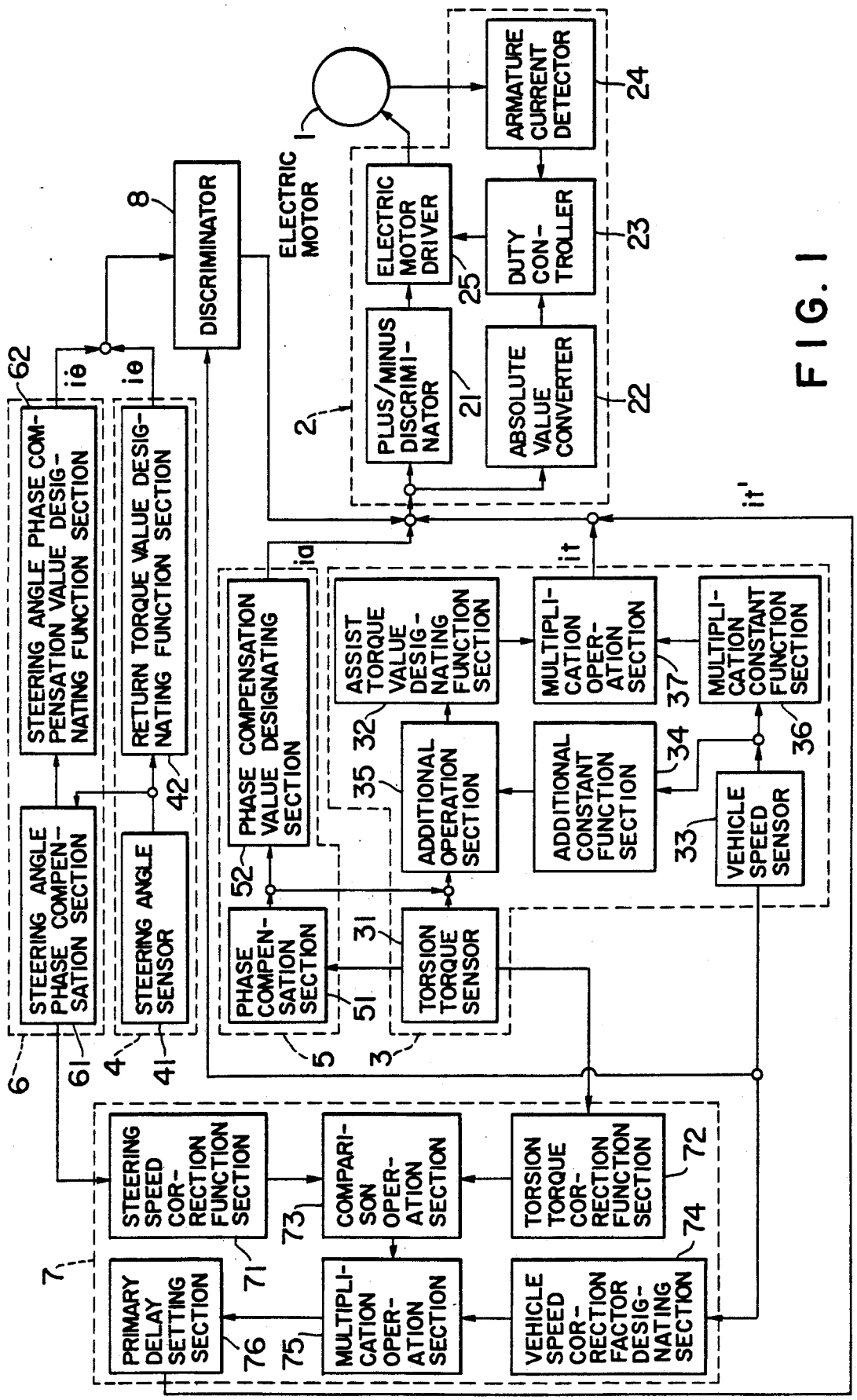
FIG. 1 is a block diagram showing an embodiment of a motor control apparatus according to the present invention.

Referring to FIGS. 1 and 1A, a power assist electric motor 1 is coupled to a pinion shaft of a rack/pinion mechanism of a steering system for supplying an assist power thereto via a speed reduction device and a joint.

Referring to FIG. 1A, a steering system 101 is a rack-and-pinion type and comprises a steering wheel 102, a steering shaft 103, a joint 104, a gear box 105, a pinion (not shown) and a rack 106 operatively connected to each other. Another rack-and-pinion device 111 is provided for an electric power steering. A pinion of the device 111 is engaged with the rack 106. The pinion is operatively connected with an output shaft 109 of a reduction gear device 108 attached to the motor 1. A torsion torque sensor 31 is provided on the gear box 105 for measuring torsion torque of the steering shaft 103, and a steering angle sensor 41 is provided adjacent to the rack 106 so as to measure an axial movement of the rack 106 corresponding to a steering angle of wheels of a vehicle (not shown). Outputs of the sensors 31 and 41 are applied to a control unit 2.

A rotational direction and torque of the electric motor 1 is controlled by the control unit 2 in accordance with a command signal supplied thereto. The command signal will be described later. The control unit 2 comprises a plus/minus discriminator 21, an absolute value converter 22, a duty controller 23, an armature current detector 24 and an electric motor driver 25. The command signal is inputted to the plus/minus discriminator 21 and the absolute value converter 22. A discrimination signal from the plus/minus discriminator 21 is inputted to the electric motor driver 25 so that the direction of motor current is changed in accordance with the command signal. An output signal from the absolute value converter 22 is supplied to the duty controller 23 to determine a duty ratio which is supplied to the electric motor driver 25 to set a rotational torque in accordance with an ar '¹tude of the command signal. The rotational torque of the electric motor 1 is controlled so as to have a constant predetermined value in such a manner that the armature current detector 24 detects an armature current of the electric motor 1 and it feeds back a detected value to the duty controller 23.

The command signal supplied to the drive control unit 2 is generated by an assist command unit 3, a return command unit 4, a phase compensation command unit 5, a steering angle phase compensation command unit 6 and a steering correction command unit 7.

Figure 2:
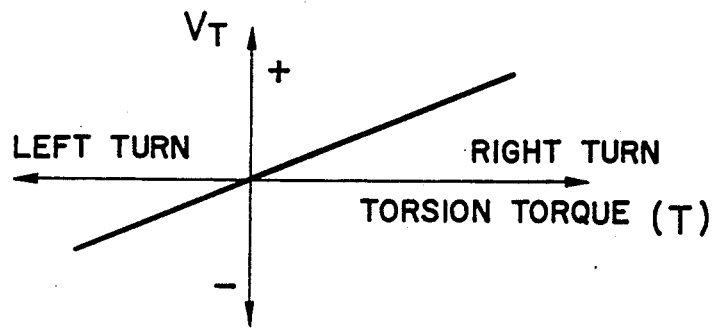
FIG. 2 is a graph showing a characteristic of a torsion torque sensor.

The assist command unit 3 generates an assist signal in accordance with magnitude and direction of the torsion torque of the steering system. The assist command unit 3 is provided with the torsion torque sensor 31 and an assist torque value designating function section 32. The torsion torque sensor 31 is mounted on, e.g., the gear box 105 of the steering system to detect the magnitude and direction of the torsion torque. The assist torque value designating function section 32 outputs the assist signal based on an output voltage signal (refer to FIG. 2) from the torsion torque sensor 31. The assist signal has the fundamental characteristic as shown by a solid line in the graph of FIG. 3. Namely, the assist signal is not outputted when the magnitude of the torsion torque is smaller than or equal to a predetermined value, but outputted when it exceeds the predetermined value while increasing or decreasing an amplitude thereof in accordance with polarity and magnitude of the torsion torque.

Figure 3:
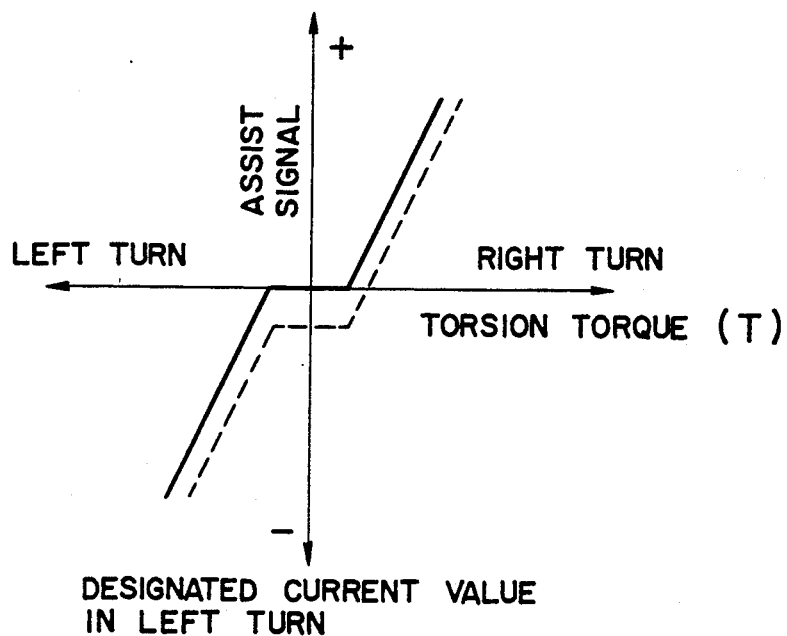
FIG. 3 is a graph showing a fundamental characteristic of an assist signal.
Figure 4:
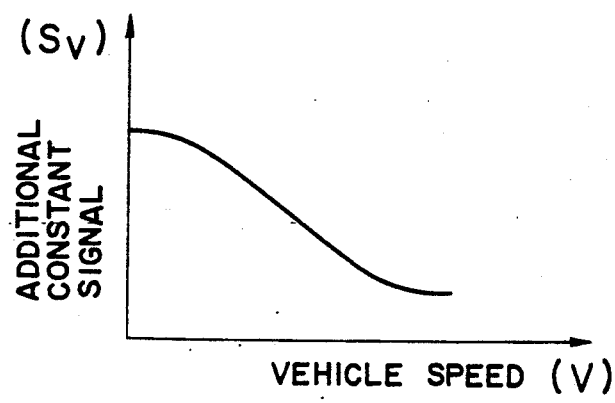
FIG. 4 is a graph showing a characteristic of an addition constant signal.

The assist command unit 3 is further provided with a vehicle speed sensor 33 for detecting speed of the vehicle, an additional constant function section 34 and an additional operation section 35. The additional constant function section 34 generates an additional constant signal Sv in accordance with an output voltage signal from the vehicle speed sensor 33, the additional constant signal Sv having a characteristic of decreasing in amplitude as the vehicle speed increases as shown in the graph of FIG. 4. The additional operation section 35 receives the additional constant signal Sv and the output signal from the torsion torque sensor 31 and outputs the sum thereof to the assist torque value designating function section 32. The additional operation section 35 performs an operation of adding/subtracting the additional constant signal Sv to/from the output signal of the torsion torque sensor 31 in accordance with the polarity of the output signal. In the characteristic shown in the graph of FIG. 3, the assist signal is controlled to change in the X axis direction as the vehicle speed changes. An output from the assist torque value designating function section 32, as shown by a solid line in FIG. 5 which represents a right turn by way of example, decreases its absolute value as the vehicle speed increases under the condition of the same torsion torque value, and increases its absolute value as the absolute value of the torsion torque increases under the condition of the same vehicle speed. In order to change the output characteristic to that shown by the broken line in FIG. 5 in accordance with the vehicle speed, there are provided a multiplication constant function section 36 and a multiplication operation section 37. The multiplication constant function section 36 outputs a multiplication constant signal having a characteristic shown in FIG. 6 in accordance with the output voltage signal from the vehicle sensor 33. The multiplication constant signal takes value 1 when the vehicle speed is 0, and a value decreasing toward 0 as the vehicle speed increases. The multiplication operation section 37 performs an operation of multiplying the output from the assist torque value designating function section 32 by the multiplication constant signal. The assist signal it from the multiplication operation section 37 has a value which changes in accordance with the vehicle speed as shown by a broken line in FIG. 5.

Figure 7:
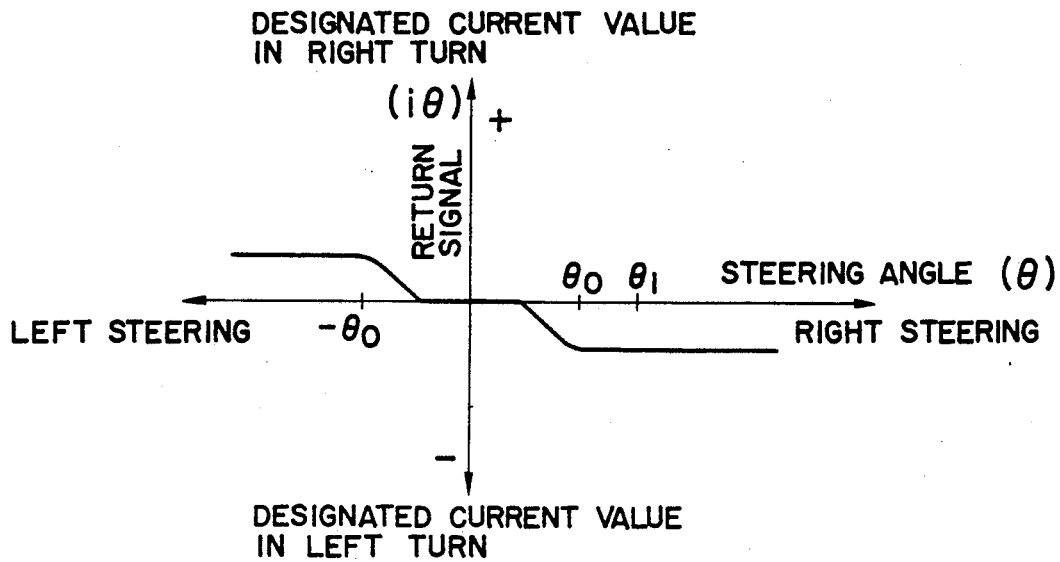
FIG. 7 is a graph showing a characteristic of a return signal.

The return command unit 4 generates a return signal for returning the steering angle to the neutral (straight forward) position in accordance with the angle of the steering system. The return command unit 4 is provided with the steering angle sensor 41 for detecting the steering angle based on the movement of, e.g., a rack of the rack/pinion mechanism of the steering system, and a return torque value designating function section 42 for outputting a return signal $i\theta$ having the characteristic shown in the graph of FIG. 7 in accordance with an output voltage signal of the steering angle from the steering angle sensor 41.

The phase compensation command unit 5 is provided with a phase compensation section 51 and a phase compensation value designating section 52. The phase compensation section 51 receives the output signal from the torsion torque sensor 31 and outputs a signal proportional to a differentiated value of an inputted signal. The phase compensation value designating section 52 outputs a supplementary assist signal ia having the characteristic shown in the graph of FIG. 8 in accordance with the output signal from the phase compensation section 51. In this embodiment, an output signal from the phase compensation section 51 is added to the output signal from the torsion torque sensor 31 to change an input signal to the assist torque value designating function section 32.

Figure 9:
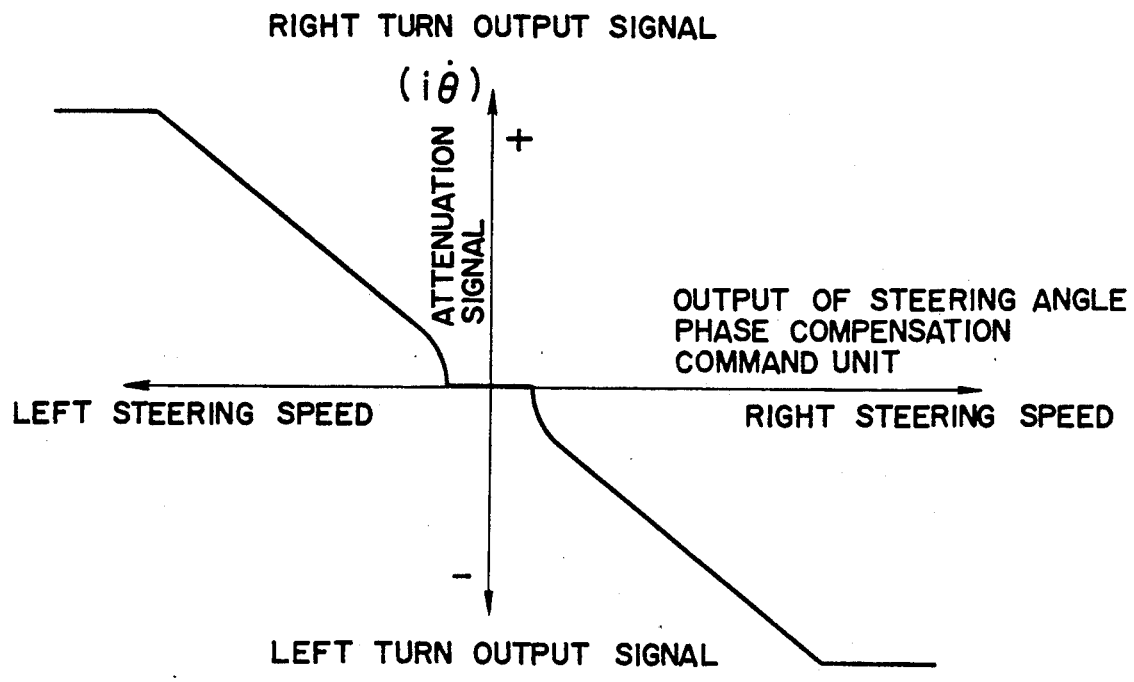
FIG. 9 is a graph showing a characteristic of an attenuation signal.

The steering angle phase compensation command unit 6 generates an attenuation signal toward a direction opposite to the direction of steering in accordance with steering operation speed. The steering angle phase compensation command unit 6 is provided with a steering angle phase compensation section 61 and a steering angle phase compensation value designating function section 62. The steering angle phase compensation section 61 receives the output signal of the steering angle from the steering angle sensor 41 and generates a signal proportional to the differentiated value of the inputted signal. The steering angle phase compensation value designating function section 62 outputs an attenuation signal $i\theta$ having a characteristic shown in the graph of FIG. 9 in accordance with the output signal from the steering angle phase compensation section 61.

The steering correction command unit 7 generates an assist correction signal which is used for assisting the steering wheel at a low steering speed and a steering wheel correcting condition after turning the steering wheel. The steering correction command unit 7 is provided with a steering speed correction function section 71, a torsion torque correction function section 72, a comparison operation section 73, a vehicle speed correction factor designating section 74, a multiplication operation section 75, and a primary delay setting section (or averaging section) 76. The steering speed correction function section 71 receives an output voltage signal from the steering angle phase compensation section 61. The torsion torque correction function section 72 receives the output voltage signal from the torsion torque sensor 31. The comparison operation section 73 receives output voltage signals from the correction function sections 71 and 72. The vehicle speed correction factor designating section 74 receives the output signal from the vehicle speed sensor 33. The multiplication operation section 75 receives signals from the vehicle speed correction factor designating section 74 and comparison operation section 73. The primary delay setting section 76 receives a signal from the multiplication operation section 75. The primary delay setting section 76 is provided in front of or after the comparison operation section 73 or torsion torque correction function section 72.

Figure 10A:
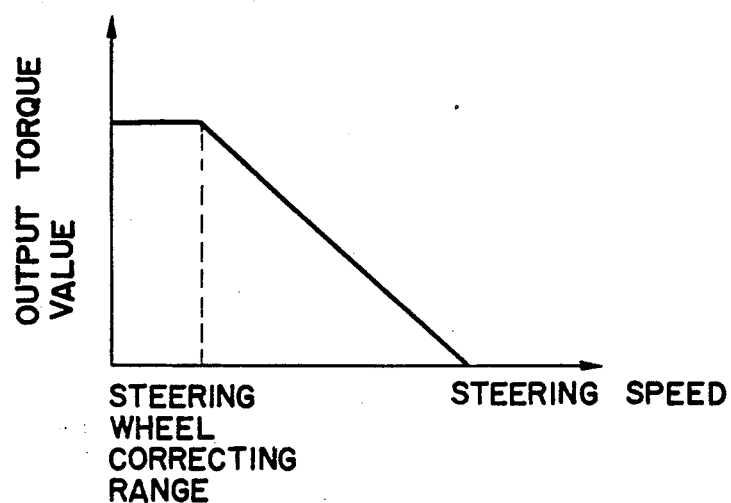
FIGS. 10a and 10b are graphs showing characteristics of output torque value signals relative to a steering speed and a torsion torque, respectively.

The steering speed correction function section 71 outputs a signal having an output torque value of which absolute value changes with the steering speed as shown in a graph of FIG. 10a. The output torque value takes a predetermined constant value within a steering wheel holding range having a low steering speed and within a steering wheel correcting range, and gradually decreases when the steering speed exceeds the steering wheel correcting range. The torsion torque correction function section 72 outputs a signal having a characteristic shown in FIG. 10b in accordance with a torsion torque. Namely, the section 72 outputs no signal when the torsion torque of the steering wheel is equal to or smaller than that of several hundreds gf (grammeforce), and quickly increases its output value when the torsion torque exceeds such a limit until the output value takes a constant value. The comparison operation section 73 compares the steering speed with the torsion torque, and outputs the value having a smaller absolute value as an assist correction signal it'.

Figure 11:
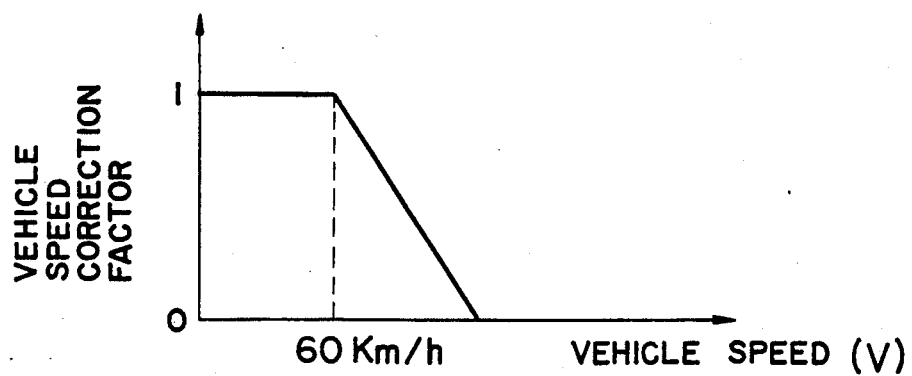
FIG. 11 is a graph showing a characteristic of a vehicle speed correction factor.

The vehicle speed correction factor designating section 74 outputs a signal representing a vehicle speed correction factor having a characteristic shown in FIG. 11. Namely, the signal takes a value 1 within the range from zero vehicle speed or very low speed (e.g., several Km/h) to about 60 Km/h, and gradually decreases its value toward 0 if the vehicle speed exceeds such a limit. The multiplication operation section 75 multiplies an output from the comparison operation section 73 by the vehicle speed correction factor. The assist correction signal it' from the multiplication operation unit 75 decreases its value as the vehicle speed increases during a high speed running.

Figure 12:
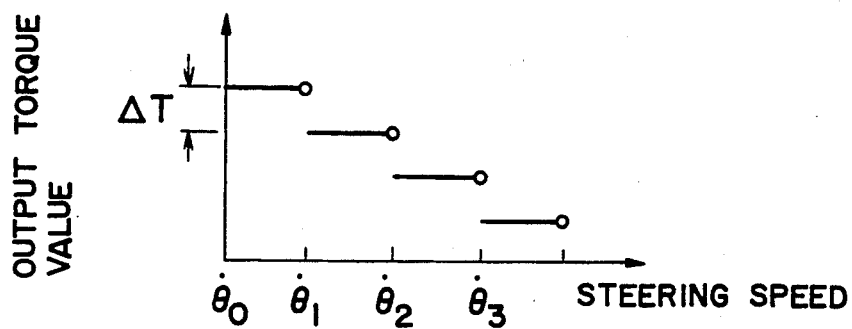
FIGS. 12 and 13 are graphs showing resolution factors of the output torque values.
Figure 13:
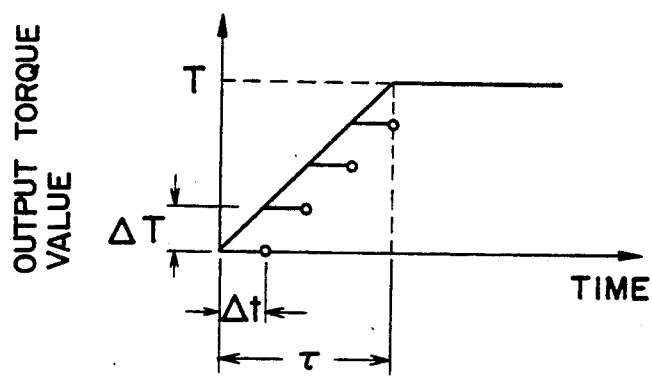

The primary delay setting section 76 is used for a low resolution, a short sampling time, and a vibratory input of the steering angle sensor 41, respectively. The section 76 is not needed when a high resolution is ensured. For instance, when the resolution of a steering angle $\theta$ of the steering angle sensor 41 is small, then the resolution of steering speed $\theta$ given by $\Delta\theta/\Delta t$ becomes small so that the resolution of output torque value becomes small as shown in FIG. 12, loosing smoothness in the change of the assist power. In such a case, when a sampling time $\Delta t$ of a steering angle change $\Delta\theta$ is large for example from 0.1 second to 1 second, a calculated resolution of steering speed $\theta$ is high. However, an amount of the output torque value changing becomes large as shown in FIG. 13, loosing accordingly smoothness of the assist power. Therefore, the primary delay setting section 76 operates to set the primary delay time constant shown in FIG. 13 in accordance with the following formulas, thereby smoothly changing assist power.

$$(T/\tau) < (\Delta T/\Delta t)$$

$$\tau > (T/\Delta T)\Delta t$$

In this embodiment, there is also provided a vehicle speed discriminator 8 for restricting to output the sum of a return signal $i\theta$ from the return command unit 4 and an attenuation signal $i\theta$ from the steering angle phase compensation command unit 6. The vehicle speed discriminator 8 receives the sum of the return signal $i\theta$ and attenuation signal $i\theta$ and outputs the sum when the vehicle speed becomes higher than or equal to, e.g., 5 Km/h with reference to the output signal from the vehicle sensor 33, and restricts outputting the sum when the vehicle speed becomes lower than 5 Km/h.

Under such restriction by the vehicle speed discriminator 8, outputted to the drive control unit 2 as the command signal is the sum of the assist signal it from the assist command unit 3, a supplementary assist signal ia from the phase compensation command unit 5 and the assist correction signal it' from the steering correction command unit 7. An addition signal of the assist signal it and the assist correction signal it' have the same code (positive/negative) as that of the assist signal it and the magnitude of $|it| + it$.

In operation of the motor control apparatus described above, upon generation of torsion torque at the steering system under steering operation, the torsion torque sensor 31 detects the torque and delivers a corresponding signal. In this case, the assist signal it t be obtained based on the torsion torque is adjusted in accordance with a information from the vehicle speed sensor 33 and the steering angle sensor 41. The assist signal it is subjected to the plus/minus discrimination and the duty ratio control based on the absolute value to thereby control the rotational direction and torque of the electric motor 1. The relationship between the torsion torque and the assist signal it is basically as shown in the graph of FIG. 3. For example, a positive assist signal is outputted for the right turn while increasing its amplitude as the torsion torque increases. Therefore, the electric motor 1 rotates in the direction of assisting the right turn with the output torque corresponding to the torsion torque, resulting in a reduction of steering force for turning to the right. For the left turn, a negative assist signal is supplied to rotate the electric motor in the direction of assisting the left turn, in a similar manner to the right turn.

Figure 5:
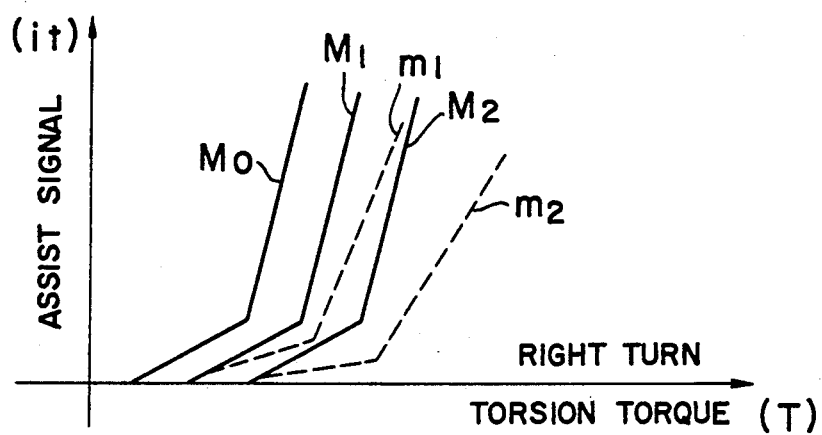
FIG. 5 is a graph showing a change of the characteristic of the assist signal.
Figure 6:
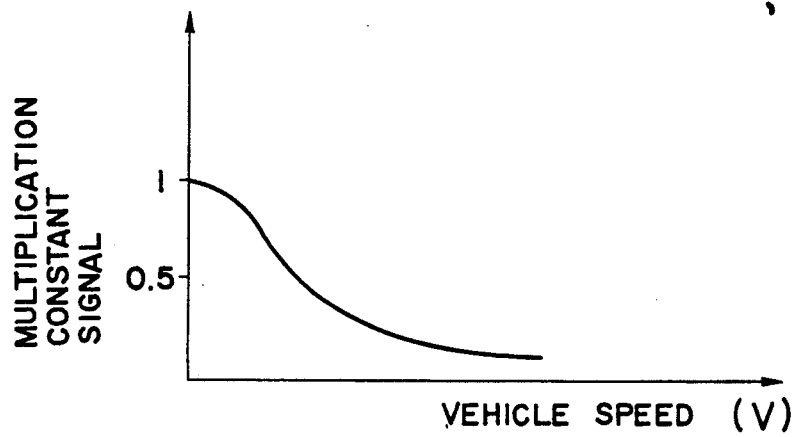
FIG. 6 is a graph showing a characteristic of a multiplication constant signal.

A functional characteristic between the torsion torque and the assist signal changes in accordance with the output signal from the vehicle sensor 33. For example, referring to the graph of FIG. 5 showing the characteristic of the assist signal relative to the right turn torsion torque, as the vehicle speed increases from 0 indicated by M0 assist signal to V1 and V2 indicated by M1 and M2 assist signals, respectively, the assist signals M1 and M2 are moved in parallel with M0 in the X-axis direction of FIG. 5 by the additional constant signal Sv from the addition constant function section 34. The assist signals M1 and M2 are changed to assist signals m1 and m2 having a smaller inclination by the multiplication constant signal. Thus, the amplitude of the assist signal decreases as the vehicle speed increases under the condition of the same torsion torque. This means that the output torque of the electric motor 1 decreases as the vehicle speed increases under the condition of the same torsion torque. Therefore, while retaining a sufficient power assist during a low speed running of the vehicle, the steering force does not become excessive during a high speed running of the vehicle, thus eliminating uneasiness caused by very light operation of the steering wheel.

In the meantime, the steering angle sensor 41 detects the steering angle upon steering operation. In accordance with the detected steering angle, the return signal $i\theta$ is outputted which has the characteristic shown in FIG. 7. Namely, the return signal $i\theta$ is not outputted near the neutral position of steering angle $\theta$, increases proportionally within the range between right and left steering angles plus/minus $\theta_0$, and takes a constant value outside the range between plus/minus $\theta_0$, while taking a negative value (left turn direction) within the right turn range and a positive value (right turn direction) within the left turn range.

The steering phase compensation section 61 detects a rapid change of the steering angle $\theta$ caused by a rapid steering at a small radius curve. In accordance with the detected signal, an attenuation signal $i\theta$ is outputted from the steering angle phase value designating function section 62, the characteristic of the attenuation signal being shown in FIG. 9.

For a higher running state than or equal to the vehicle speed of 5 Km/h, the return signal $i\theta$ and attenuation signal $i\theta$ are added so as to decrease the assist signal it under the function of the vehicle speed discriminator 8, thereby eliminating uneasiness due to too light handling operation during rapid steering. In addition, for example, during maintaining the steering at the right turn steering angle $\theta_1$, the positive assist signal it obtained based on the output signal from the torsion torque sensor 31 is added to the negative return signal $i\theta_1$ obtained based on the output signal from the steering angle sensor 41 to control the electric motor 1 in accordance with the added signal. In FIG. 3, the assist signal it is indicated by a solid line, whereas the added signal is indicated by a broken line. Consequently, upon releasing the steering wheel at the right turn steering angle $\theta_1$, the torsion torque T decreases considerably so that the added signal immediately takes the negative value (left turn direction) following the broken line shown in FIG. 3. As a result, torque in the left turn direction is generated on the electric motor 1 so that friction force at the reduction mechanism and moment of inertia of the motor 1 are cancelled to smoothly recover (during running at 5 Km/h or higher) the straight forward direction of the steering system 101, resulting in a good recovery of the steering wheel 102. The amplitude of the return signal $i\theta$ decreases to 0 as the steering angle $\theta$ decreases so that when the steering angle $\theta$ returns to the neutral position, the torque of the electric motor 1 disappears.

In the case where the steering wheel 102 is returned to the neutral position after a rapid turn (high-G turn), the steering wheel 102 may sometimes goes over the neutral position because of the moment of inertial of the electric motor 1. However the attenuation signal $i\theta$ outputted from the steering angle phase compensation command unit 6 prevents an excessive return of the steering wheel 102 because the attenuation signal $i\theta$ functions to generate the output torque opposite to the rotational direction of the steering wheel 102, thus improving the operation after releasing the steering wheel 102 during the high speed running or the like.

Next, the steering operation during stopping the vehicle, i.e., a stop steering operation will be described. In this case, since the ground or road resistance is large, the torsion torque becomes very large during the steering operation, the output voltage signal from the torsion torque sensor 31 becomes very large correspondingly. This increase of the torsion torque T is detected by the phase compensation section 51 of the phase compensation command unit 5 so that an output signal corresponding to such increase of the torsion torque T is added to the output signal from the torsion torque sensor 31. Consequently, even at the state where the torsion torque T is small and the corresponding assist signal it is not still generated, when such an increase of the torsion torque T is large, then the assist signal it is outputted at once so that the electric motor 1 immediately actuates without any response delay to the stop steering operation and in addition, self-excited vibrations are prevented from being generated.

During the stop steering operation at the lower vehicle speed than or equal to 5 Km/h, the outputs of the return signal $i\theta$ from the return command unit 4 and the attenuation signal $i\theta$ from the steering angle phase compensation command unit 6 are restricted by the vehicle speed discriminator 8. Therefore, there occurs no energy waste so that a smooth steering can be realized.

Figure 8:
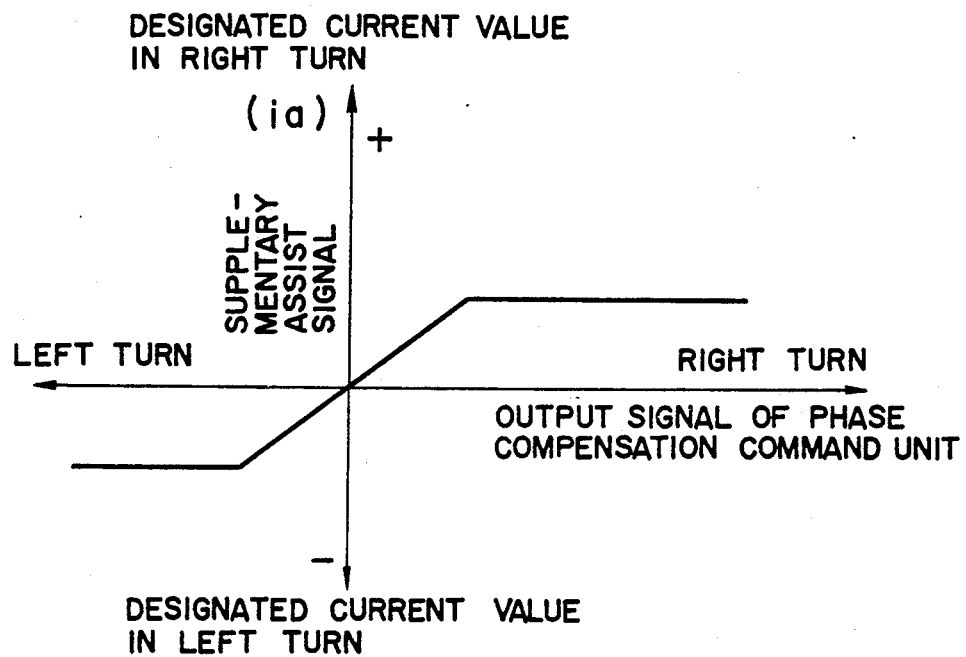
FIG. 8 is a graph showing a characteristic of a supplemental assist signal.

Upon delivery of the output signal from the phase compensation section 51, the supplementary assist signal ia having the characteristic shown in FIG. 8 is immediately outputted from the phase compensation value designating function section 52, in accordance with the direction of change of the torsion torque T. The supplementary assist signal ia increases or decreases proportionally within the predetermined value range of change of the torsion torque T, and takes a constant value over the predetermined value range. Consequently, for example, during repetitive steering operations of right and left turn, the supplementary assist signal ia is immediately outputted to absorb moment inertia at the start and the stop of the electric motor 1.

Next, description will be given for the case of a low steering speed during the steering wheel holding condition while a vehicle runs on a large curve, and during the steering wheel correction condition after the steering wheel has been turned. In such a case, there are the outputs from the steering angle phase compensation section 61 and the torsion torque sensor 31 so that the steering speed correction function section 71 and the torsion torque correction function section 72 generates output torque values. The torque value having a smaller absolute value is outputted as the assist correction signal it' from the comparison operation section 73. In this case, when the vehicle speed is equal to or lower than 60 Km/h, the vehicle speed correction factor is 1 so that the multiplication operation section 75 outputs the assist correction signal it' which is used as the command signal to assist steering power for holding or correcting the steering wheel. Alternatively, when the vehicle speed exceeds 60 Km/h and increases further, a vehicle speed correction factor becomes small correspondingly so that the assist correction signal it' to the multiplication operation section 75 gradually decreases. Consequently, the steering power during the high speed running does not become excessive, thereby retaining stability of steering.

If the torsion torque T is equal to or smaller than the predetermined value during running under the steering wheel holding or correction condition, the assist correction signal it' is not outputted, but it is outputted while gradually increasing its value after the torsion torque T exceeds the predetermined value. Therefore, the steering power assist can be performed smoothly without any shock.

Figure 14:
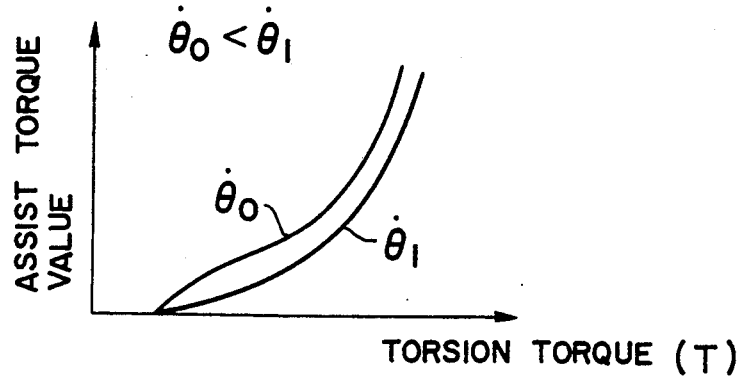
FIG. 14 is a graph showing a characteristic of an assist torque value change.

If the steering speed exceeds the steering wheel correcting range and increases further, the absolute value of the assist correction signal it' gradually decreases. Therefore, under the same vehicle speed and torsion torque condition, the assist torque value becomes smaller for a lower steering speed $\theta_0$ than a higher steering speed $\theta_1$ as shown in FIG. 14. Consequently, too light handling does not occur, and even repetitive steerings during the straight forward running allow proper feelings to a driver.

Figure 10B:
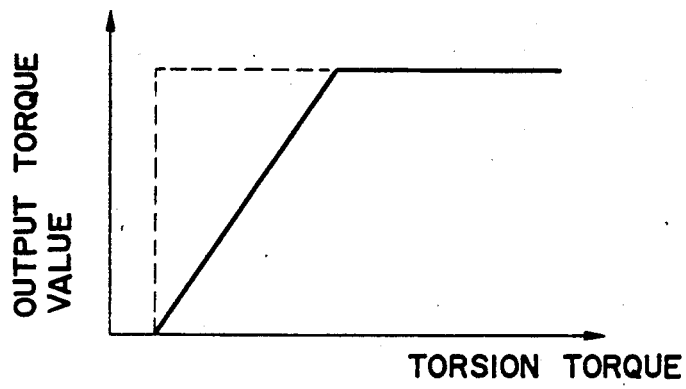

The output characteristic of the torsion torque corresponding function section 72 is used as shown by a broken line in FIG. 10b wherein the output torque value takes a predetermined value at once.

According to the present invention, when the steering speed is small or in a small correction range, the supplementary assist signal ia is outputted and proper assisting force is added to the steering wheel 102.

And when the steering speed becomes higher than the predetermined range, the absolute value of the supplementary assist signal ia gradually decreases, so that there is no too light but comfortable feeling of the steering wheel 102 while straightly driving the vehicle with repeating small correction of the steering angle.

While the presently preferred embodiment of the present invention has been shown and described, it is to be understood that these disclosures are for the purpose of illustration and that various changes and modifications may be made without departing from the scope of the invention as set forth in the appended claims.

What is claimed is:

1. A motor control apparatus for an electric power steering system mounted on a vehicle, having wheels, a steering wheel operatively connected to said wheels, an electric motor for assisting the operation of said steering wheel, a torsion torque sensor for detecting a torsion torque of said steering system, a vehicle speed sensor for detecting a vehicle speed, a steering angle sensor for detecting a steering angle of said steering wheel, and controlling means responsive to at least said torsion torque and said vehicle speed for controlling a rotational direction and an output torque of said electric motor so as to assist the operation of said steering wheel, comprising:
   detecting means for detecting a steering speed of said steering wheel; and
   assist torque signal producing means responsive to said steering speed and said torsion torque for producing an assist torque signal depending upon the magnitude of said torsion torque thereby to assist holding said steering wheel at a desired steered angle away from neutral position when said steering speed is within a predetermined low range near zero and said torsion torque is generated when the vehicle is going around a curve;
   said controlling means responsive to said assist torque signal for controlling said electric motor.

2. The system according to claim 1, wherein said producing means comprises:
   a steering speed correction function section provided to set a first torque value defined by a first function for increasing said first torque value as the steering speed decreases:
   a torsion torque correction function section provided to set a second torque value defined by a second function for increasing said second torque value as the torsion torque increases; and
   a comparison operation section provided to select a smaller torque value of said first and second values and for generating said assist torque signal of said smaller torque value.

3. The motor control apparatus according to claim 2, wherein
   said first function increases said first torque value to a predetermined value at a predetermined steering speed as the steering speed decreases and maintains said first torque value at said predetermined value when said steering speed is smaller than said predetermined steering speed.

4. The motor control apparatus according to claim 2, wherein
   said second function increases said second torque value from zero at a first predetermined torsion torque to a predetermined value at a second predetermined torsion torque as the torsion torque increases and maintains said second torque value at said predetermined value when said torsion torque is larger than said second predetermined torsion torque.

5. The motor control apparatus according to claim 2, wherein said producing means further comprises:
   a vehicle speed correction factor designating section provided to set a correction factor defined by a third function for keeping said correction factor at a set value until said vehicle speed reaches a set vehicle speed and gradually decreasing said correction factor from said set value as said vehicle speed increases; and
   a multiplication operation section provided to correct said assist torque signal by said correction factor.

6. The motor control apparatus according to claim 5, wherein
   said set vehicle speed is 60 km/h.

7. The motor control apparatus according to claim 5, wherein said producing means further comprises:
   a delay setting section provided to smoothly change said assist torque signal as time lapsed by a first-order delay function.

8. A motor control apparatus for an electric power steering system mounted on a vehicle to obtain proper assist power during conditions of small torsion torque and correction of the steering wheel,
   said vehicle having wheels, a steering wheel operatively connected to said wheels, an electric motor for assisting operation of said steering wheel, a torsion torque sensor for detecting a torsion torque of said steering system, a vehicle speed sensor for detecting a vehicle speed, a steering angle sensor for detecting a steering angle of said steering wheel, and controlling means responsive to at least said torsion torque and said vehicle speed for controlling a rotational direction and an output torque of said electric motor so as to assist said operation of said steering wheel, said motor control apparatus comprising:

detecting means for detecting a steering speed of said steering wheel; and assist torque signal producing means for responsive to said steering speed and said torsion torque for producing an assist torque signal depending upon the magnitude of said torsion torque thereby to assist holding said steering wheel at a desired steering angle when said steering speed is within a predetermined low range near zero and said torsion torque is generated as when the driver is holding the steering wheel for running said vehicle on a gentle curve or when the driver is correcting the steering wheel after turning it;

said controlling means being responsive to said assist torque signal for controlling said electric motor.

9. The system according to said claim 8, wherein said producing means comprises:

a steering speed correction function section provided to set a first torque value defined by a first function for increasing said first torque value as the steering speed decreases;

a torsion torque correction function section provided to set a second torque value defined by a second function for increasing said second torque value as the torsion torque increases; and a comparison operation section provided to select a smaller torque value of said first and second values and for generating said assist torque signal of said smaller torque value.

10. The motor control apparatus according to claim 9, wherein said producing means further comprises:

a vehicle speed correction factor designating section provided to set a correction factor defined by a third function for keeping said correction factor at a set value until said vehicle speed reaches a set vehicle speed and gradually decreasing said correction factor from said set value as said vehicle speed increases; and a multiplication operation section provided to correct said assist torque signal by said correction factor.

11. The motor control apparatus according to claim 10, wherein said producing means further comprises:

a delay setting section provided to smoothly change said assist torque signal as time lapsed by a first-order delay function.

* * * * *